(12) United States Patent
Kopanski et al.

(10) Patent No.: US 9,428,268 B2
(45) Date of Patent: Aug. 30, 2016

(54) FLEXBEAM HINGE FOR HELICOPTER BLADE ACTIVE TRAILING EDGE FLAP

(71) Applicant: Sikorsky Aircraft Corporation, Stratford, CT (US)

(72) Inventors: Kris Kopanski, Milford, CT (US); Devon Cowles, New Milford, CT (US); David E. Bruno, Milford, CT (US); Frederick J. Miner, Barkhamsted, CT (US); Benjamin Reed Hein, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 500 days.

(21) Appl. No.: 13/933,756

(22) Filed: Jul. 2, 2013

(65) Prior Publication Data

US 2015/0010401 A1    Jan. 8, 2015

(51) Int. Cl.
*B64C 27/615* (2006.01)
*B64C 27/72* (2006.01)

(52) U.S. Cl.
CPC ............ *B64C 27/615* (2013.01); *B64C 27/72* (2013.01); *B64C 2027/7266* (2013.01); *Y02T 50/34* (2013.01)

(58) Field of Classification Search
CPC .............. B64C 27/615; B64C 2027/7261; B64C 2027/7266; B64C 2027/7272; B64C 2027/7277; B64C 2027/7283; B64C 2027/7288; B64C 2027/7294
USPC .............. 416/23, 24, 134 A, 136, 138, 141; 244/211–215
See application file for complete search history.

(56) References Cited

U.S. PATENT DOCUMENTS

| | | | |
|---|---|---|---|
| 4,299,538 A * | 11/1981 | Ferris ..................... | B64C 27/33 416/134 A |
| 4,352,631 A * | 10/1982 | Buchs ..................... | B64C 27/33 416/134 A |
| 4,746,272 A | 5/1988 | Noehren et al. | |
| 4,898,515 A | 2/1990 | Beno et al. | |
| 5,100,294 A * | 3/1992 | Crannage ................ | B64C 27/51 416/134 A |
| 5,419,513 A | 5/1995 | Flemming, Jr. et al. | |
| 5,431,538 A | 7/1995 | Schmaling et al. | |
| 5,690,474 A | 11/1997 | Byrnes et al. | |
| 5,738,494 A | 4/1998 | Schmaling | |
| 5,913,659 A | 6/1999 | Doolin et al. | |
| 6,000,453 A | 12/1999 | Davis | |
| 6,209,824 B1 * | 4/2001 | Caton ...................... | B64C 7/00 244/213 |
| 6,474,945 B1 * | 11/2002 | Nakasato ............... | B64C 27/615 29/889.7 |
| 6,739,834 B2 | 5/2004 | Mochida et al. | |
| 6,805,948 B2 | 10/2004 | Yasui | |
| 7,695,249 B2 | 4/2010 | Krauss et al. | |
| 2008/0302914 A1 * | 12/2008 | Wagner ................... | B64C 9/16 244/131 |
| 2013/0064674 A1 | 3/2013 | Hunter et al. | |
| 2013/0294914 A1 * | 11/2013 | Hein ....................... | B64C 27/48 416/147 |

* cited by examiner

*Primary Examiner* — Christopher Verdier
(74) *Attorney, Agent, or Firm* — Cantor Colburn LLP

(57) ABSTRACT

A flexbeam for a rotor blade is provided and includes a first end coupled to a body of the rotor blade and a second end coupled to a flap disposed along a trailing edge of the body to pitch about a pitching axis defined along a span of the body and a flexbeam body extending from the first end to the second end and being configured to retain the flap under a first loading and being flexible about the pitching axis.

12 Claims, 4 Drawing Sheets

FLEXBEAM HINGE FOR HELICOPTER BLADE ACTIVE TRAILING EDGE FLAP

STATEMENT REGARDING FEDERALLY SPONSORED RESEARCH OR DEVELOPMENT

This invention was made with government support under Contract No. W911W6-11-2-0001 awarded by the Army. The government has certain rights in this invention.

BACKGROUND OF THE INVENTION

The subject matter disclosed herein relates to a helicopter blade active trailing edge flap and, more particularly, to a flexbeam hinge for an active trailing edge flap of a helicopter blade.

In most helicopters, a main rotor is disposed at a top portion of the helicopter fuselage and a tail rotor is disposed at a rear of the fuselage. The main and tail rotors are formed of multiple blades and cooperatively operate to provide uplift, thrust and control for the helicopter by rotating at high speed. The blades may include actively controlled trailing edge flaps that can be pitched around a pitching axis defined along the span of the corresponding blade for added control.

Typically, the active control of each of the trailing edge flaps of a helicopter is provided by bearing designs in which a rotating shaft is supported by ball or spherical bearings. The actively controlled trailing edge flaps may be actuated at least once and, in some cases, up to five times per revolution of the rotor blade. As such, the bearings tend to exhibit large wear rates and a constant need for lubrication due to their sliding contact with nearby components. These large wear rates often lead to frequent replacement of the bearings and high associated costs. In addition, the bearings lead to frictional moments in the bearing designs that must be overcome by pitch control systems especially wear high frequency pitching is required.

BRIEF DESCRIPTION OF THE INVENTION

According to one aspect of the invention, a flexbeam for a rotor blade is provided and includes a first end coupled to a body of the rotor blade and a second end coupled to a flap disposed along a trailing edge of the body to pitch about a pitching axis defined along a span of the body and a flexbeam body extending from the first end to the second end and being configured to retain the flap under a first loading and being flexible about the pitching axis.

According to another aspect of the invention, a rotor blade system is provided and includes a rotor blade body having a span extending between first and second ends and a chord extending between first and second edges, the body being rotatable about an axis proximate to the first end to define the second edge as a trailing edge, a flap disposed along the trailing edge and being configured to pitch about a pitching axis defined along the span and a flexbeam coupled at a first end thereof to the body and at a second end thereof to the flap. The flexbeam is configured to retain the flap under first, second and third loadings and is flexible about the pitching axis.

According to yet another aspect of the invention, a helicopter is provided and includes a rotor blade having a span extending between first and second ends and a chord extending between first and second edges, the rotor blade being rotatable about an axis proximate to the first end to define the second edge as a trailing edge, a flap disposed along the trailing edge, constrained to deform with the rotor blade and configured to pitch about a pitching axis defined along the span and a flexbeam including a first end coupled to a body of the rotor blade, a second end coupled to the flap and a flexbeam body extending from the first end to the second end and being configured to retain the flap under first, second and third loadings and being flexible to rotate the flap about the pitching axis.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Aspects of the present invention are directed to a system for motion control of an actively controlled trailing edge flap on a helicopter rotor blade. The actively controlled trailing edge flap rotates about a pitching axis defined in parallel with a span of the rotor blade such that a nose-up or nose-down pitching moment is created to control the pitch of the rotor blade itself. The system includes a hinge that allows for the pitching motion (i.e., the rotation about the pitching axis).

Figure 1:
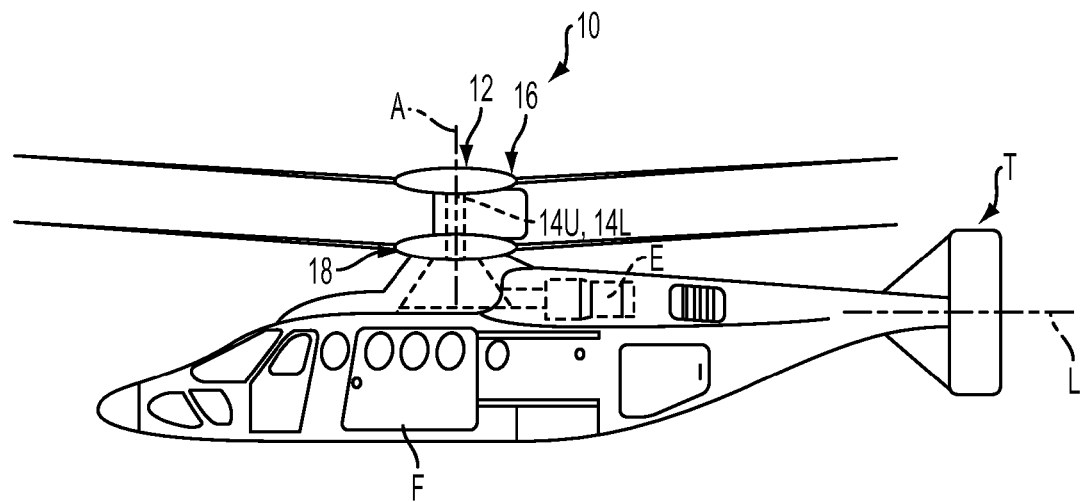
FIG. 1 is a side view of an exemplary rotary-wing aircraft in accordance with embodiments.

FIG. 1 illustrates an exemplary vertical takeoff and landing (VTOL) rotary-wing aircraft 10 having a dual, counter-rotating, coaxial rotor system 12 which rotates through a counter-rotating main rotor shaft 14U, 14L about an axis of rotation A. The aircraft 10 includes a fixed airframe F, which supports the dual, counter rotating, coaxial rotor system 12 as well as an optional translational thrust system T, which provides translational thrust during high speed forward flight in a direction that is generally parallel to an aircraft longitudinal axis L. Although a particular counter-rotating, coaxial rotor system aircraft configuration is illustrated in the disclosed embodiment, other rotor systems and other aircraft types, such as conventional single rotor aircraft, tilt-wing and tilt-rotor aircraft, will also benefit from the present invention.

Figure 2:
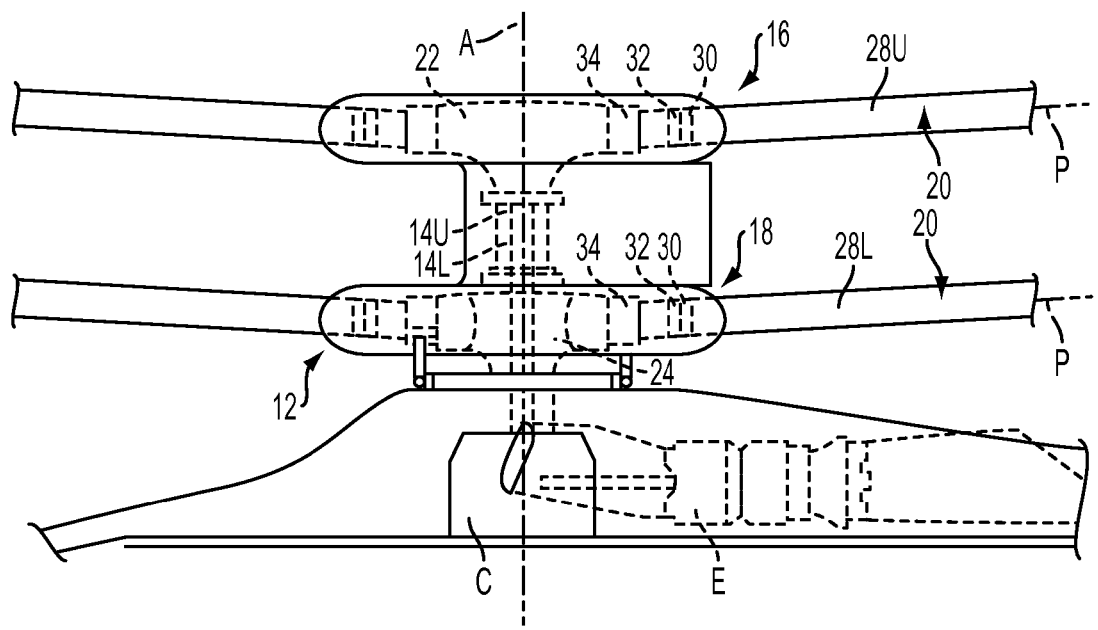
FIG. 2 is an expanded partial phantom view of a dual counter-rotating coaxial rotor system of the aircraft of FIG. 1.
Figure 3:
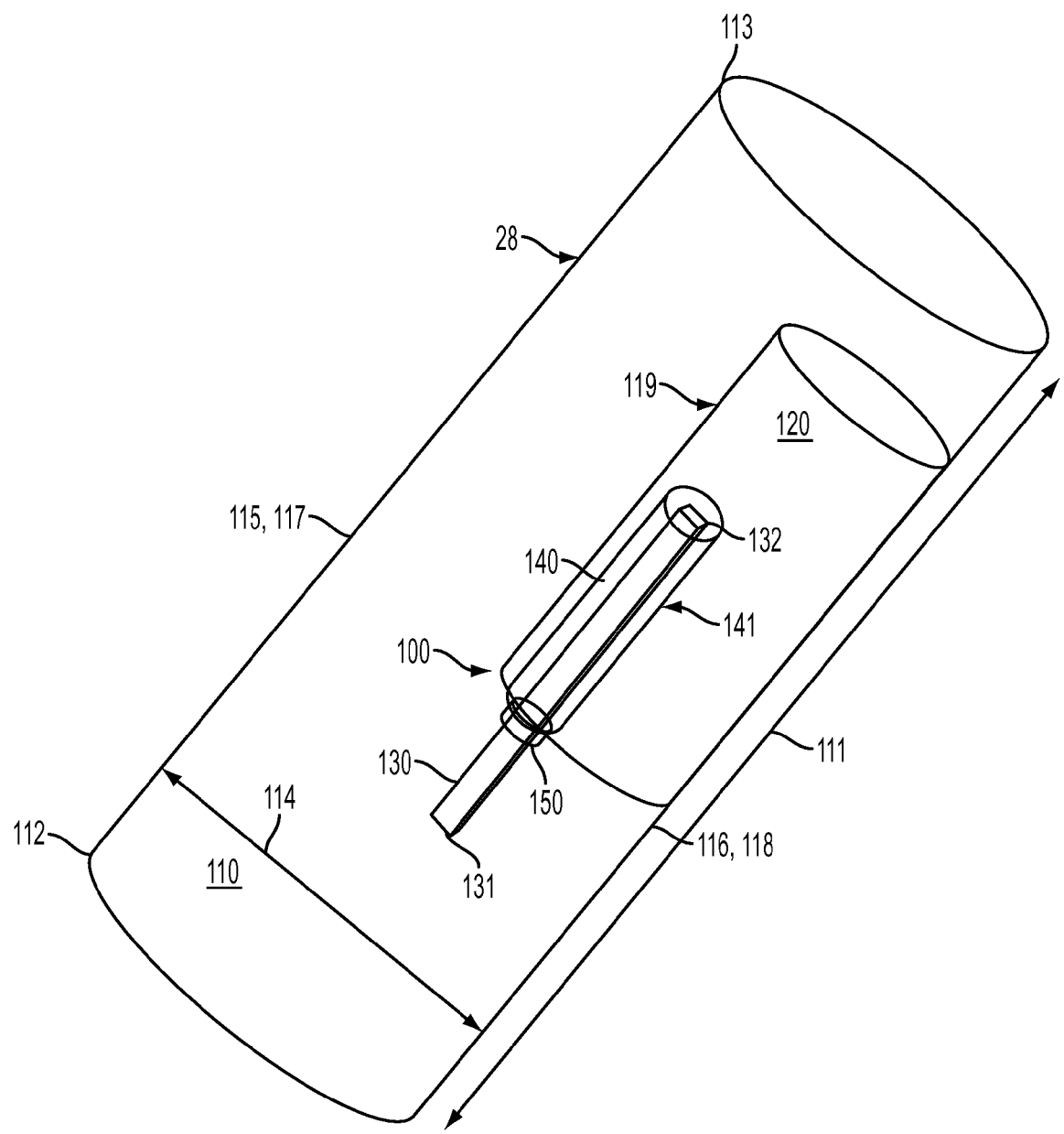
FIG. 3 is a perspective view of a rotor blade, a trailing edge flap and a flexbeam in accordance with embodiments.

With reference to FIG. 2, a main gearbox C is driven by one or more engines or motors (illustrated schematically at E) and in turn drives the rotor system 12 to generate lift. The translational thrust system T may also be driven by the same main gearbox C to provide thrust. As shown, the main gearbox C may be interposed between the engines E, the rotor system 12 and the translational thrust system T.

The dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about the rotor axis of rotation A. The rotor hub assembly 22 is mounted to the upper rotor shaft 14U which counter rotates within the lower rotor shaft 14L which rotates the lower hub assembly 24.

The plurality of the main rotor blade assemblies 20 project substantially radially outward from the hub assemblies 22, 24. Any number of main rotor blade assemblies 20 may be used with the rotor system 12. Each rotor blade assembly 20 of the rotor system 12 generally includes a rotor blade 28 (illustrated somewhat schematically), a rotor blade spindle 30, and a rotor blade bearing 32, which supports the rotor blade spindle 30 within a bearing housing 34 to permit the rotor blade 28 to pitch about a pitching axis P. It should be understood that various blade attachments may also be utilized with the present invention.

With reference to FIGS. 3-7, a rotor blade system 100 for use with, e.g., the rotor blade 28 of FIG. 2 is provided. The system 100 includes a rotor blade body 110 having a span-wise dimension 111 extending between a first longitudinal end 112 and a second end longitudinal end 113, which is opposite the first longitudinal end 112, and a chordal dimension 114 extending between a first edge 115 and a second edge 116, which is opposite the first edge 115. The rotor blade body 110 is rotatable about the rotor axis of rotation A (see FIG. 2), which is proximate to the first longitudinal end 112. Such rotation defines the first edge 115 as a leading edge 117 and the second edge 116 as a trailing edge 118.

The system 100 further includes an actively controlled trailing edge flap 120 disposed in a recess 119 defined in the rotor blade body 110 from the trailing edge 118, a flexbeam 130, a torque tube 140 and a sealing element 150. The trailing edge flap 120 may be constrained by one or more bearing elements to deform with the rotor blade body 110. A trailing edge of the trailing edge flap 120 is disposable to be in-line with the trailing edge 118 of the rotor blade body 110 when the trailing edge flap 120 is in a neutral position thereof. From this neutral position, the trailing edge flap 120 is configured to pitch upwardly or downwardly about the pitching axis P (see FIGS. 2, 4 and 5), which is defined in parallel with the span-wise dimension 111.

While shown as the spanwise dimension 111 being parallel with the trailing edge 118, it is understood that the chord can vary over the length of the span, in which case the spanwise dimension 111 would not be parallel to the trailing edge 118. Thus, the pitching axis P may be parallel with the tailing edge 118 and/or the spanwise dimension 111.

The flexbeam 130 may be formed of fiber/epoxy composites and has a first end 131 and a second end 132, which is opposite the first end 131. The flexbeam 130 is coupled at the first end 131 to the rotor blade body 110 and at the second end 132 to the trailing edge flap 120. As will be described below, the flexbeam 130 is configured to retain the trailing edge flap 120 to the rotor blade body 110 under a first loading L1 (see FIG. 4). In accordance with further embodiments, the flexbeam 130 is configured to retain the trailing edge flap 120 to the rotor blade body 110 under the first loading L1 and at least one or more of a second loading L2 (see FIG. 5) and a third loading L3 (see FIG. 4). In addition, the flexbeam 130 is configured to be flexible about the pitching axis P (see FIGS. 6 and 7).

Figure 4A:
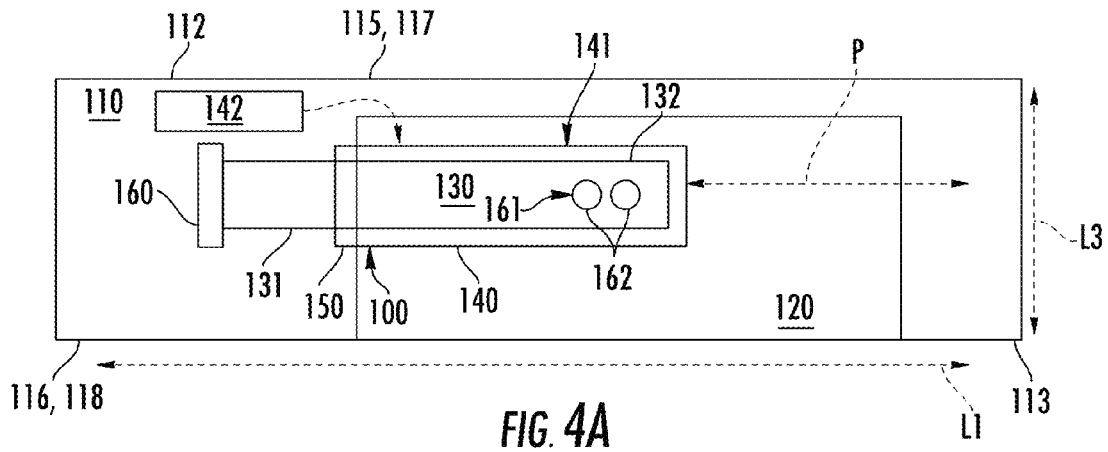
FIG. 4A is a plan view of the rotor blade, the trailing edge flap and the flexbeam of FIG. 3, in accordance with an aspect of an exemplary embodiment.
Figure 4B:
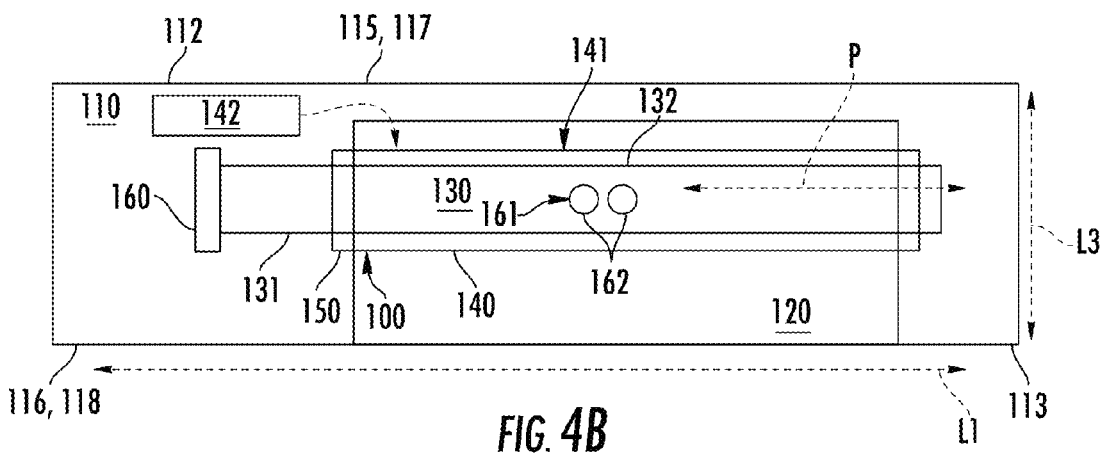
FIG. 4B is a plan view of the rotor blade, the trailing edge flap and the flexbeam of FIG. 3, in accordance with another aspect of an exemplary embodiment.
Figure 5:
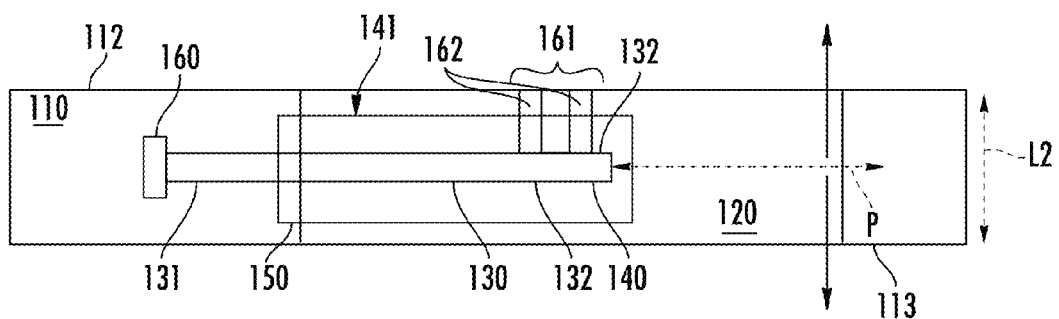
FIG. 5 is an elevational view of the rotor blade, the trailing edge flap and the flexbeam of FIG. 3.

As shown in FIGS. 4 and 5, the first, second and third loadings L1, L2 and L3 may be transversely oriented with respect to one another. That is, the first loading L1 may be directed in a radial dimension relative to the rotor axis of rotation A (i.e., centrifugal loading), the second loading L2 may be directed in an axial dimension defined along the rotor axis of rotation A (i.e., flapping loading) and the third loading L3 may be directed in a circumferential dimension defined in a tracking plane of the rotor blade 28 and transversely oriented relative to the rotor axis of rotation A (i.e., lagging loading).

The torque tube 140 is disposed in a cavity 141 defined within the trailing edge flap 120 to surround the portion of the flexbeam 130 extending through the trailing edge flap 120. As shown in FIG. 4, the torque tube 140 is operably coupled to control element 142, which provides servo pitching commands to the torque tube 140, and is configured to cause the trailing edge flap 120 to pitch about the pitching axis P in response to the servo pitching commands. In accordance with embodiments, the torque tube 140 may be replaced with another similar feature or discarded. In the latter case, the control element 142 may provide the servo pitching commands to the trailing edge flap 120 directly to cause the trailing edge flap 120 to pitch about the pitching axis P. The flexbeam 130 reacts to the pitching motion as explained below.

The sealing element 150 is disposed about the flexbeam 130 between the trailing edge flap 120 and the rotor blade body 110. In this position, the sealing element 150 serves to prevent or at least substantially inhibit the ingress of moisture into the torque tube 140 or the cavity 141.

The first end 131 of the flexbeam 130 is coupled to the rotor blade body 110 by a first framing element 160 and the second end 132 of the flexbeam is coupled to the trailing edge flap 120 by a second framing element 161. The first framing element 160 may include rigid or semi-rigid support elements connected to the rotor blade body 110 and the first end 131 of the flexbeam 130. The second framing element 161 may include fastening elements 162 extending through at least the trailing edge flap 120 and the flexbeam 130. The fastening elements 162 transfer the torque from the torque tube 140 to the flexbeam 130 in torsional response to the servo control of the control element 142.

In accordance with embodiments and, as shown in FIGS. 4A and 4B, the flexbeam 130 may extend through only a portion of the trailing edge flap 120 or an entirety of the trailing edge flap 120 such that the flexbeam 130 protrudes into the rotor blade body 110 beyond the span of the trailing edge flap 120. In either case, the second framing element 161 may be located at about a 50% span location of the trailing edge flap 120.

Figure 6:
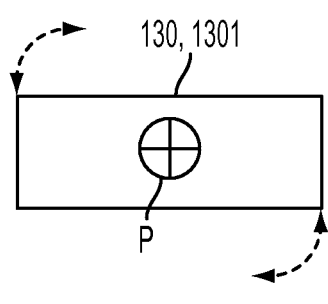
FIG. 6 is a radial view of the flexbeam of FIGS. 3-5 in accordance with embodiments.
Figure 7:
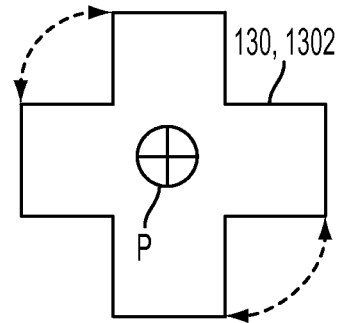
FIG. 7 is a radial view of the flexbeam of FIGS. 3-5 in accordance with alternative embodiments.

In accordance with alternative embodiments and, as shown in FIGS. 6 and 7, a cross-section of the flexbeam 130 may be substantially rectangular 1301 or substantially cruciform 1302. In either case, the corners of the flexbeam 130 could be chamfered or rounded. In any case, the structure of the flexbeam 130 should be sufficiently rigid or semi-rigid such that the flexbeam 130 can resist bending due to the first loading L1, the second loading L2 and the third loading L3 while remaining flexible about the pitching axis P so as to react to the pitching motion imparted by the control element 142. The ability of the cross-sectional structure of the flexbeam 130 to exhibit the above-noted characteristics is aided by the flexbeam 130 materials. That is, the fiber (i.e., graphite)/epoxy composites have anisotropic properties that maximize axial, flap and edgewise stiffness while minimizing torsional stiffness and thus are strong in the radial, axial and circumferential dimensions but permit the pitching about the pitching axis P.

The flexbeam 130 has advantages over previous bearing designs in which a rotating shaft supported by ball or spherical bearings is provided. The actively controlled trailing edge flap 120 on a helicopter blade will be actuated at least once and at most five times per revolution of the rotor blade and any mechanical bearing with sliding contact will have large wear rate and a constant need for lubrication. The flexbeam 130 on the other hand has no sliding contacts and thus requires no lubrication. At the same time, the use of the fiber/epoxy composites can allow the flexbeam 130 to have long fatigue life and possibly an unlimited life, while traditional bearings would have to be replaced quite often due to their wear. The flexbeam 130 may not experience any wear. In addition, typical bearings are either metal or ceramic and thus could be quite heavy, which is undesirable for helicopter rotor blade stability and loads. The flexbeam 130 on the other hand is relatively light. Moreover, the flexbeam 130 eliminates a source of friction in the trailing edge flap 120 control system. Friction is detrimental to the high frequency actuation of the trailing edge flap 120. The use of the flexbeam 130 minimizes the friction by eliminating bearing sliding friction.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotor blade system, comprising:
   a rotor blade body having a span extending between first and second ends and a chord extending between first and second edges,
   the body being rotatable about an axis proximate to the first end to define the second edge as a trailing edge;
   a flap disposed along the trailing edge and being configured to pitch about a pitching axis defined along the span;
   a flexbeam coupled at a first end thereof to the body and at a second end thereof to the flap, the flexbeam being configured to retain the flap under first, second and third loadings and being flexible to rotate the flap about the pitching axis; and
   a torque tube surrounding the flexbeam.

2. The rotor blade according to claim 1, wherein the first, second and third loadings are transversely oriented.

3. The rotor blade system according to claim 1, wherein the first loading comprises centrifugal loading, the second loading comprises flapping loading and the third loading comprises lagging loading.

4. The rotor blade system according to claim 1, wherein the torque tube is configured to cause the flap to pitch about the pitching axis.

5. The rotor blade system according to claim 1, further comprising a sealing element disposed about the flexbeam between the flap and the body.

6. The rotor blade system according to claim 1, further comprising:
   a first framing element by which the first end of the flexbeam is coupled to the body; and
   a second framing element by which the flexbeam is coupled to the flap.

7. The rotor blade system according to claim 6, wherein the second framing element is located at about a 50% flap span.

8. The rotor blade system according to claim 1, wherein the flexbeam extends through an entirety of the flap.

9. The rotor blade system according to claim 1, wherein a cross-section of the flexbeam is one of substantially rectangular and substantially cruciform.

10. The rotor blade system according to claim 1, wherein the flexbeam comprises fiber/epoxy composites.

11. A helicopter, comprising:
    a rotor blade having a span extending between first and second ends and a chord extending between first and second edges, the rotor blade being rotatable about an axis proximate to the first end to define the second edge as a trailing edge;
    a flap disposed along the trailing edge, constrained to deform with the rotor blade and configured to pitch about a pitching axis defined along the span;
    a flexbeam including a first end coupled to a body of the rotor blade, a second end coupled to the flap and a flexbeam body extending from the first end to the second end and being configured to retain the flap under first, second and third loadings and being flexible to rotate the flap about the pitching axis; and
    a torque tube surrounding the flexbeam.

12. The helicopter according to claim 11, further comprising a control element coupled to the flexbeam and configured to rotate the flap about the pitching axis by way of the flexbeam.

* * * * *